J. B. BURDETT.
WELDING OR CUTTING TORCH.
APPLICATION FILED DEC. 24, 1910.
1,002,136.
Patented Aug. 29, 1911.
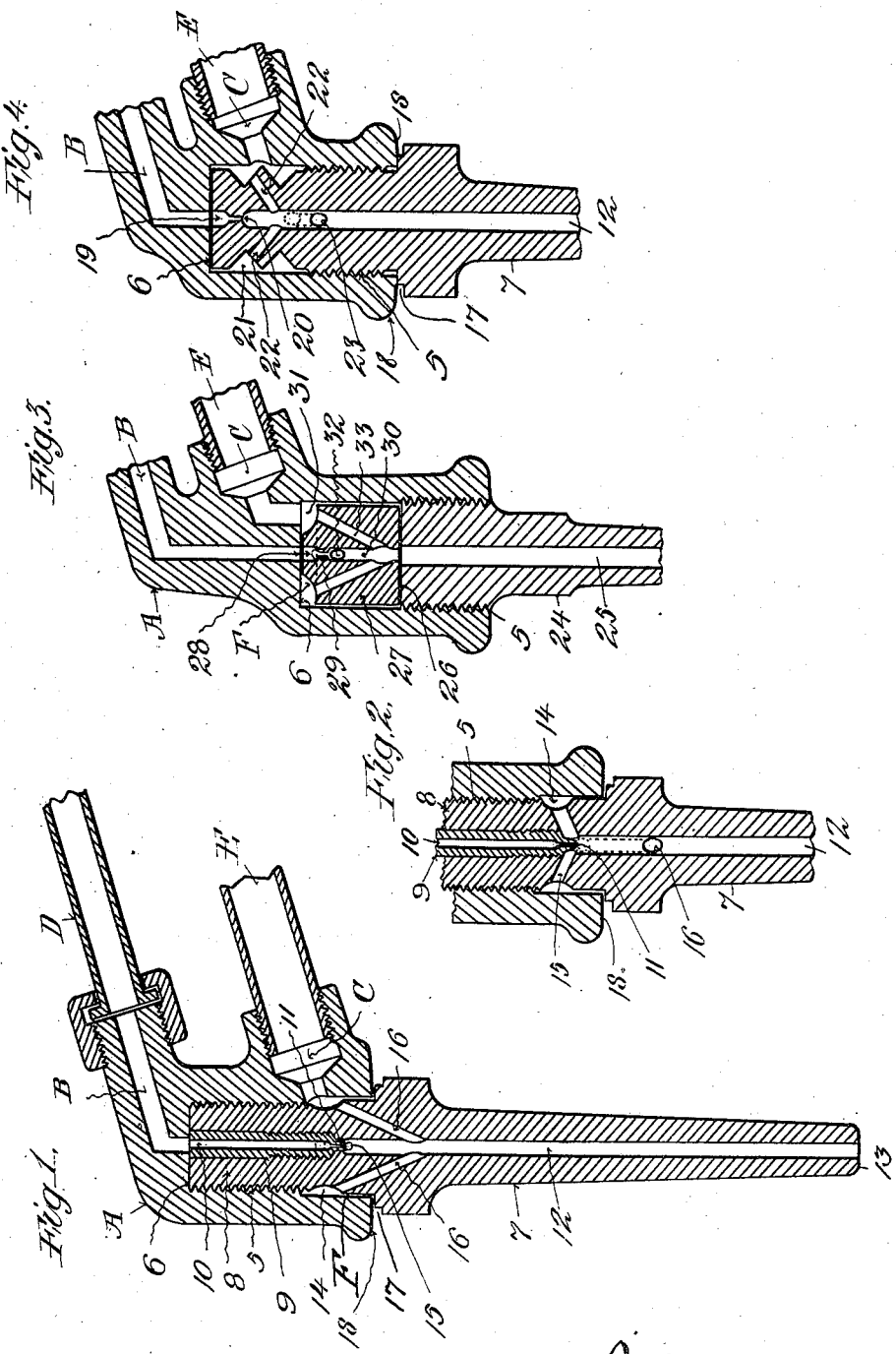

UNITED STATES PATENT OFFICE.

JOHN B. BURDETT, OF CHICAGO, ILLINOIS, ASSIGNOR TO NATIONAL PNEUMATIC COMPANY, OF CHICAGO, ILLINOIS, A CORPORATION OF DELAWARE.

WELDING OR CUTTING TORCH.

1,002,136.      Specification of Letters Patent.      Patented Aug. 29, 1911.

Application filed December 24, 1910. Serial No. 599,191.

*To all whom it may concern:*

Be it known that I, JOHN B. BURDETT, a citizen of the United States, residing at Chicago, county of Cook, State of Illinois, have made a certain new and useful Invention in Welding or Cutting Torches, of which the following is a specification.

The invention relates to torches for welding and cutting purposes, and particularly to torches of the class employing a combustible gas, such for instance as acetylene mixed with oxygen, and wherein the acetylene is delivered to the torch nipple by suction produced by the delivery of the oxygen under higher pressure, to produe the welding or cutting flame.

The object of the invention is to produce a torch of the character referred to which is simple in structure and efficient in operation.

A further object is to provide a device of simple structure wherein the tip or nozzle portion of the torch may be readily removed and another substituted according to the character of the work to be done.

A further object is to insure a proper proportioning of the relative gas supply and mixing chamber areas without depending upon the care and judgment of workmen in assembling the parts of the torch.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing, and to the various views and reference signs appearing thereon, Figure 1 is a broken view in central longitudinal section of a welding torch embodying the principles of my invention. Fig. 2 is a similar view, the plane of section being at right angles to that of Fig. 1. Figs. 3 and 4 are views similar to Fig. 1 showing modified forms of torch embodying the principles of my invention.

In the practical use of welding or cutting torches employing a mixture of combustible gases, and particularly where acetylene is mixed with oxygen under higher pressure, it has been found important to observe a fixed relation between the area through which the oxygen is supplied and that of the chamber in which the mixture of the acetylene and oxygen takes place, for each particular class of work to be done, and to vary this relation of oxygen supply and mixing channel areas according to various classes of work. In order to provide means whereby the same torch, as a whole is adapted for various classes or kinds of work it has been proposed to make the burner nipple or tip part removable and replaceable, and substituting a nipple or tip in which the size of the oxygen passage bears a given relation to the area of mixing channel, for another having a different relative proportion of these areas. One important difficulty encountered in carrying out this idea has been found to be the danger of assembling the various parts constituting the nipple or tip portion of the torch, so as to get the right parts for the particular class of work to be done. Workmen are not always careful in this regard, with the result, frequently, that the oxygen supply is too great, or is not great enough for the particular work required, thereby causing serious injury to the work or metal to be operated on. Experience has also demonstrated that certain gases employed for welding torches, particularly oxygen and acetylene, possess peculiar characteristic of affinity with respect to each other which require special provisions for securing an intimate mixture thereof to form the required composition for the welding flame.

It is among the special purposes of my present invention to provide a construction of torch tip or nozzle, which avoids the objections noted, insures the proper admixture of the gases, which can be easily and readily manufactured, which is removable and replaceable, and which avoids the possibility of an improper assemblage of parts.

In the drawing A designates a cap or head having passages B, C, therein. Delivering to the passage B is a connection D with a source of gas supply, in this instance oxygen under pressure. Delivering to the passage C, is a pipe or other connection E from a source of gas supply, in this instance acetylene. The head or cap A is provided with a chamber F, see Fig. 3, which is interiorly screw threaded as indicated at 5. The chamber F is provided with a plane flat end surface 6, centrally through which the oxygen passage B delivers into the chamber F. The acetylene passage C, also delivers into the chamber F. The location of the communication of the acetylene passage C with the chamber F is not of material consequence and I have shown said point of communication at different locations in the several views of the drawing.

The nipple or tip portion of the torch may be of various constructions, within the spirit and scope of my invention.

In Figs. 1 and 2 this tip is indicated at 7 and comprises a threaded shank portion 8, adapted to be screwed into the interiorly threaded portion of the cap A. The inner flat end surface of the tip 7 is designed to bear against the flat wall surface 6, at the base of the chamber of the head. A threaded plug 9, is screwed longitudinally into the rear end of the tip 7. Longitudinally and centrally through the plug 9 is formed a duct or channel 10. This duct or channel 10, when the tip is screwed home into the threaded chamber of head A, communicates with the oxygen delivery passage B. At its front end the bore or duct 10 of plug 9, is reduced to a very fine area, as indicated at 11, to constitute an injector nozzle. The body of the tip 7, is provided with a longitudinal centrally arranged channel 12 which extends to the extreme end 13, of the tip and, preferably, is of uniform area throughout its length. The nozzle 11 of reduced area of the plug 9, projects into the inner end of the channel 12.

In the forms shown in Figs. 1 and 2 the shank of the tip 7 is annularly grooved as shown at 14, the passage C for the acetylene communicating with the annular groove 14. The body of the tip 7 is provided with ducts 15, 16, extending from the annular channel 14 to the longitudinal channel 12 extending through the tip 7. In the form shown in Fig. 1 the ducts 15 deliver into the channel 12 at a point closely adjacent the nozzle 11 of reduced area of the bore 10 of plug 9, while the ducts 16 deliver from the annular channel 14 into the tip channel 12 at a point considerably removed from the nozzle 11, and closer toward the extreme end 13 of the tip.

If desired the body of the tip 7 may be provided with an annular shoulder 17 arranged when the tip is screwed into the chamber F, to abut against the outer end wall 18 of head A.

In Fig. 4 I have shown the tip 7 with a slightly modified structure of threaded shank. In this construction I omit the plug 9, in the inner end of the shank of the tip, and in lieu thereof I form a bore 19 longitudinally in the inner end of the shank of the tip, and into which the oxygen passage B delivers, this passage 19 terminating in a portion of reduced area as indicated at 20 forming a nozzle or injector which delivers into the longitudinal channel 12 of the tip. In this construction also the interiorly threaded portion of the chamber of the cap is formed at the outer end of said chamber, and the threaded portion of the shank of tip 7, is next adjacent the bearing annular shoulder 17, and does not extend to the extreme inner end of said shank portion. In the construction shown in Fig. 4 the shank of the tip, intermediate the threaded portion thereof and its extreme inner end, is formed with the annular channels 21 with which communicates the acetylene passage C. These annular channels 21 are shown as provided with angular walls through which the ducts 22, 23, are formed, corresponding, respectively, with the ducts 15, 16, of the structure shown in Figs. 1 and 2. The advantage of the specific structure shown in Fig. 4 lies in the facility in manufacture in forming the ducts 22, 23, which deliver from the channels 21 into the tip channel 12.

In Fig. 3 I have shown another modified structure embraced within the scope of my invention wherein the tip 24, corresponding in some respects with the tip 7 of the construction shown in Figs. 1, 2 and 4, is provided with a longitudinal channel 25 throughout its entire length, which is of uniform area throughout. This tip is threaded into the interiorly threaded portion 5 of the chamber F of head A. Interposed between the flat end surface 26 of the tip 24, and the flat end wall 6 of chamber F is a plug 27. In this plug is formed a channel 28 registering with the oxygen passage B, and having a nozzle part 29 of reduced area to form an injector. The reduced nozzle portion delivers into a longitudinal channel 30 formed centrally through the plug 27 in longitudinal continuation of channel 29 and registering with the central longitudinal channel 25 in the tip 24. The plug 27 is provided with an annular channel 31 in its end surface with which communicates the acetylene passage C. The plug 27 is also provided with the inclined ducts 32, 33 corresponding, respectively, with ducts 15, 16, of Figs. 1 and 2, and 22, 23, of Fig. 4, the ducts 32 delivering from the annular channel 31 into the longitudinal channel 30 of plug 27, at a point closely adjacent the nozzle 29, while the ducts 33 deliver from the annular channel 31, to the longitudinal bore 30 at a point farther removed from the nozzle 29.

From the foregoing description it will be seen that my invention embraces the idea of a plurality of ducts or passages delivering from the source of acetylene to a longitudinal channel formed through the tip portion of the torch, and which constitutes the mixing channel for the gases employed to produce the welding or cutting flame at the extremity 13 of the tip. It will also be seen that these ducts or passages for the delivery of the acetylene communicate with the mixing channel at different points in the length thereof, some of said ducts delivering to the mixing channel at a point closely adjacent the injector nozzle through which the oxygen is supplied to the mixing chamber. It is noted that the portion 30 of the bore of plug 27, in the form shown in Fig. 3, constitutes an extension of the mixing channel.

In operation the oxygen under higher pressure is delivered to the mixing channel through the injector nozzle at a point closely adjacent the delivery ends of the inclined ducts communicating with a source of acetylene and consequently the flow of oxygen under higher pressure through the injector nozzle serves to draw or aspirate the acetylene into the mixing channel and to carry the acetylene along with it.

Experience has demonstrated that under conditions of practical operation oxygen and acetylene bear a peculiar relation to each other when combined for the purpose of producing intense flame for welding or cutting purposes. Apparently there is a strong affinity between these gases whereby the acetylene is drawn into close proximity to the oxygen but not into an intimate mixture therewith. Apparently there is a surface repulsion of the two gases the one for the other which tends to prevent and retard the efficient mixing thereof, and an efficient mixture of the gases is necessary in order to produce the best results in a torch for welding or cutting purposes. In accordance with the principles of my invention the relation of the inclined ducts 15, 22, 32, as shown and described, with reference to the injector nozzle through which the oxygen is supplied, is such as to impel an efficient mixing of the gases. But to insure a thorough mixing of the gases the ducts 16, 23, 33, deliver acetylene to the mixing channel at a point removed toward the extremity of the tip with reference to the injector nozzle, and all of the ducts, referred to, being inclined, a rolling action, initiated at the injector nozzle, and continued by the delivery of acetylene through the ducts at a point remote from the nozzle, is imparted to the gases, thereby resulting in an efficient mixture thereof.

In devices of the nature referred to, various classes of work require various conditions of the welding or cutting flame, that is, varying conditions of relative proportions of the oxygen and acetylene. An excess of oxygen for particular kinds of work is injurious to the material being operated on and an excess of acetylene in other kinds of work is equally objectionable. In order that the same torch as a whole, may be employed, for different kinds of work, the tip portion is made removable and replaceable, so that tips variously proportioned with reference to the areas of the injector nozzle and the passage delivering thereto, as compared with the area of the acetylene passages and with the area of the mixing channel, may be employed in the same torch according to the particular work in hand.

A device embodying the principles of my invention, as above described, affords a very simple removable and replaceable tip capable of being manufactured and which requires no skill or judgment in assembling and which, therefore may be employed, removed and replaced by ordinary workmen without danger of improper assembling.

The torch construction embodying my invention is equally well adapted for welding and for cutting purposes. The controlling difference in the use of the device for the one or the other of these purposes is the difference in oxygen supply, or the pressure under which it may be supplied. By merely varying the relative supply or pressure of the oxygen the device may be used for the one or the other purpose.

Having now set forth the object and nature of my invention, and various structures embodying the principles thereof, what I claim as new and useful, and of my own invention, and desire to secure by Letters Patent, is,—

1. A torch including a chambered head, a tip removably secured in said head, and provided with a mixing channel, means for delivering a high pressure and a low pressure gas to the mixing channel of the tip, including an injector nozzle for the high pressure gas, said tip having a plurality of ducts or passages, all communicating with the low pressure gas supply and delivering therefrom into the mixing channel of the tip, said ducts or passages communicating with the mixing channel at different points removed from each other in the direction of the length of the mixing channel.

2. A torch including a chambered head, having passages delivering to the chamber thereof from sources of gas supply, a tip with an injector nozzle of reduced area communicating with one of said passages, and having a mixing channel into which the injector nozzle delivers, and also having a duct communicating with the other of said passages and delivering to the mixing channel at a point closely adjacent the point of delivery of the injector nozzle, said tip having another duct also delivering from said last mentioned passage to the mixing channel at a point removed from the point of delivery of the injector nozzle.

3. A torch having a head provided with a chamber and passages communicating therewith and delivering from sources of gas supply, the end wall of said chamber presenting a flat bearing surface, a tip removably mounted in said chamber and having a portion provided with a flat bearing surface coöperating with said first mentioned bearing surface, and a longitudinal mixing channel and a duct communicating with said channel and with one of said gas supply passages, said tip portion also formed with an annular channel communicating with the other of said gas supply passages, and also with a plurality of ducts delivering from said annular channel to the mixing channel at various points removed from each other lengthwise of said mixing channel.

4. A torch comprising a cap or head having high pressure and low pressure gas supply passages, and a chamber to which said passages deliver, a removable tip secured in said chamber and provided with a plug seated in the end thereof, said plug having a longitudinal bore and communicating with the high pressure gas supply passage, said bore terminating in a nozzle of reduced area, said tip having an annular channel communicating with the low pressure gas supply channel, said tip having a longitudinal channel forming a mixing channel into which the nozzle delivers, and also having a duct delivering from the annular channel to the mixing channel adjacent to the point of delivery of the nozzle therein, and a duct delivering from the annular channel into the mixing channel at a point removed from the point of delivery of the nozzle.

In testimony whereof I have hereunto set my hand in the presence of the subscribing witnesses, on this 16th day of December A. D., 1910.

JOHN B. BURDETT.

Witnesses:
  HUGH S. ADAMS,
  HAROLD ROWNTREE.